United States Patent [19]

Bugiel

[11] Patent Number: 4,744,300

[45] Date of Patent: May 17, 1988

[54] UTILIZATION OF METAL HYDRIDE AND ACIDIC REAGENT FOR THE ACCELERATING OF MASSES AND PROPULSION DEVICES FOR APPLYING SUCH MATERIALS

[75] Inventor: Horst G. Bugiel, Bonn, Fed. Rep. of Germany

[73] Assignee: Diehl GmbH & Co., Nuremberg, Fed. Rep. of Germany

[21] Appl. No.: 772,319

[22] Filed: Sep. 4, 1985

[30] Foreign Application Priority Data

Sep. 25, 1984 [DE] Fed. Rep. of Germany ....... 3435076
Sep. 25, 1984 [DE] Fed. Rep. of Germany ....... 3435075

[51] Int. Cl.[4] .......................... C06D 5/06; F02K 9/08
[52] U.S. Cl. .................................... 102/291; 102/287; 60/213; 60/234; 60/240; 60/254
[58] Field of Search ............... 60/233, 234, 240, 251, 60/253, 254, 213; 102/287, 289, 291

[56] References Cited

U.S. PATENT DOCUMENTS

| | | | |
|---|---|---|---|
| 3,101,592 | 8/1963 | Robertson et al. ............. | 60/39.463 |
| 3,127,735 | 4/1964 | Bauerle et al. ......................... | 60/213 |
| 3,136,120 | 6/1964 | Grosh ..................................... | 60/254 |
| 3,164,093 | 1/1965 | Holzman et al. ....................... | 60/253 |
| 3,174,833 | 3/1965 | Blackmer ............................ | 137/211 |
| 3,256,688 | 6/1966 | Hill ........................................ | 60/253 |
| 3,354,647 | 11/1967 | Aycock .................................. | 60/254 |
| 3,486,332 | 12/1969 | Robertson et al. . | |
| 3,524,317 | 8/1970 | Glockstein ............................ | 60/215 |
| 3,529,420 | 9/1970 | Guyot .................................... | 60/240 |
| 3,705,495 | 12/1972 | Greiner et al. ........................ | 60/215 |
| 3,898,048 | 8/1975 | Barber et al. .......................... | 23/281 |
| 3,930,804 | 1/1976 | Hickey . | |
| 3,931,935 | 1/1976 | Beckert et al. ...................... | 423/648 |
| 4,022,705 | 5/1977 | Beckert et al. .................. | 252/188.31 |
| 4,161,657 | 7/1979 | Shaffer, Jr. .......................... | 290/1 R |
| 4,185,582 | 1/1980 | Bryant .................................. | 73/514 |
| 4,274,333 | 6/1981 | Lampton ............................ | 102/418 |
| 4,298,777 | 11/1981 | Bryant .................................. | 73/503 |
| 4,359,396 | 11/1982 | Maeland ......................... | 252/188.25 |

FOREIGN PATENT DOCUMENTS

1122403 2/1958 Fed. Rep. of Germany .
1667277 12/1967 Fed. Rep. of Germany .
1010453 7/1962 United Kingdom .
1425590 11/1973 United Kingdom .
2077715 12/1981 United Kingdom .

Primary Examiner—Peter A. Nelson
Assistant Examiner—Eric Jorgensen
Attorney, Agent, or Firm—Scully, Scott, Murphy & Presser

[57] ABSTRACT

The utilization of metal hydride and an acidic reagent for the accelerating of masses, and propulsion devices for applying such materials. The materials are of a saline complex metal hydride and acidic reagent which is sprayed onto the metal hydride which is offered in a lumpy consistency, for the pulse-like generation of expanding reaction gas bubbles in a constructive or dynamically, yieldably dammed chamber. Also provided is a propulsion device for the application of the above materials, with a support for a saline complex metal hydride of a lumpy consistency in a yieldably dammed expansion chamber in which an injection nozzle for the reagent is directed towards a surface portion of the metal hydride.

26 Claims, 4 Drawing Sheets

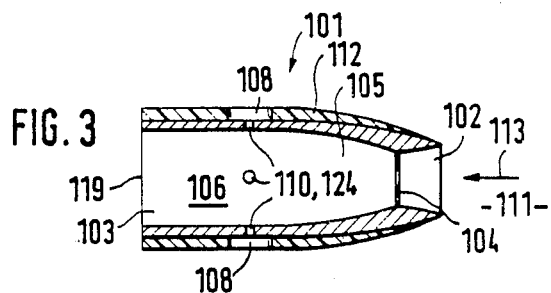
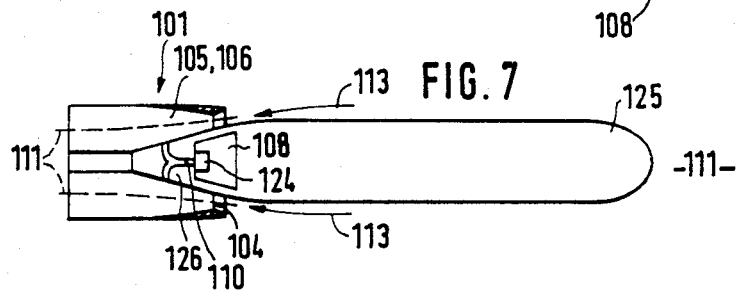
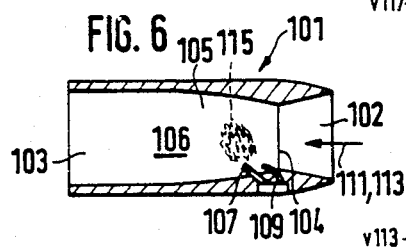
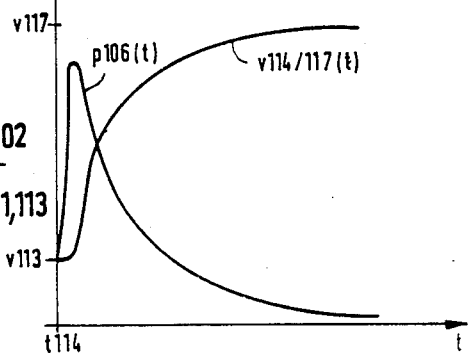
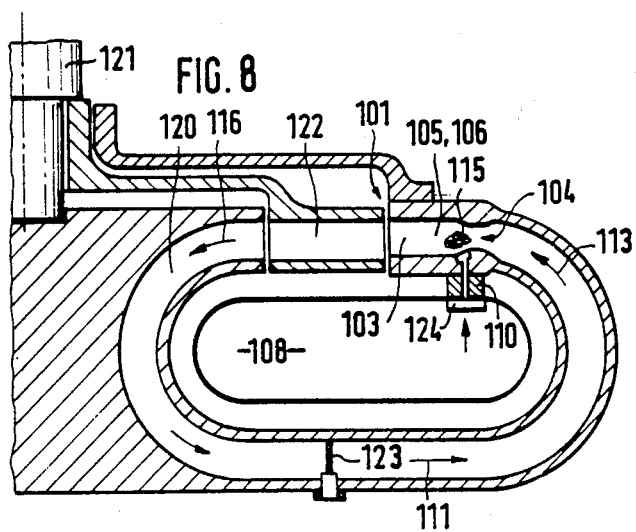

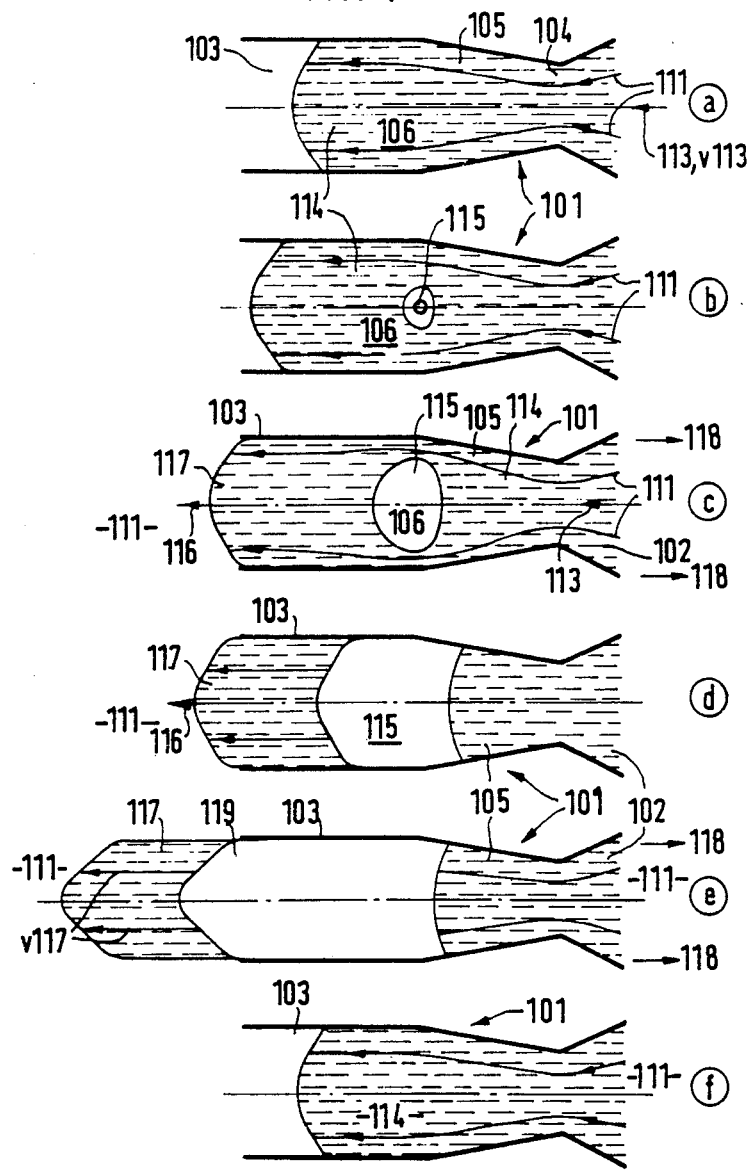

UTILIZATION OF METAL HYDRIDE AND ACIDIC REAGENT FOR THE ACCELERATING OF MASSES AND PROPULSION DEVICES FOR APPLYING SUCH MATERIALS

BACKGROUND OF THE INVENTION

1. Field of the Invention

The present invention relates to the utilization of metal hydride and an acidic reagent for the accelerating of masses. Moreover, the invention also relates to propulsion devices for applying such materials.

2. Discussion of the Prior Art

It is presently known that a mass which is to be accelerated can be employed as the yieldable; in effect, deviating portion of the damming for an expansion chamber in which there are generated, either non-recurrently or periodically, intensely expanding reaction gases, for instance, through the burning down of a propellant powder (for the firing of a projectile from a weapon barrel), or through the combustion of liquid propellants or fuels (for example, for the linear or rotational movement of the piston in an Otto or Diesel engine). However, this mass which is to be accelerated need not be a rigid projectile-shaped or piston-shaped structural element; but can also relate to the mass of a fluid which reacts slowly or sluggishly to dynamic loads, as in the instance of a water reaction or jet motor used for the propulsion of watercraft, as is known from the disclosure of German Pat. No. 11 22 403.

In the interest of obtaining a satisfactory degree of thermodynamic efficiency, for the acceleration of a mass as the result of the expansion of a reaction gas bubble (dammed by the mass which is to be accelerated), there is basically made an effort that the chemical reaction in the dammed reaction chamber produces as steep a pressure rise as possible in the then energy-rich expanded reaction bubble at the smallest possibly quantity of materials which must be employed, which on the other hand, should be as uncritical as possible with regard to its safety in storage and handling and its operational dependability. For an increase in the density of the reaction gas energy and in the reaction gas quantity relative to the quantity of the utilized reaction partners, there have been investigated numerous groupings of reaction partners.

In instances, in which has there has actually been achieved a noticeable rise in the quantity of energy-rich reaction gas, this finally concerns itself always with the application of reaction partners which, because of economical or technological reasons, will practically not come into consideration; namely, for example, since certain materials which are necessary for the reaction, are available to the large extent required by the industry or at a tenable price, or since the toxicity, in effect, the reaction compatability (danger of spontaneous ignition) of reaction partners, must present barely realistically fulfillable safety demands on the storage and handling of the materials.

SUMMARY OF THE INVENTION

Accordingly, it is an object of the present invention to meet the urgent need for energy-rich expanding reaction bubbles which are technologically uncritically obtainable at an extreme rapid pressure rise, from commercially readily available reaction partners.

The foregoing object is achieved through the utilization of materials of a saline complex metal hydride and acidic reagent which is sprayed onto the metal hydride which is offered in a lumpy consistency, for the pulse-like generation of expanding reaction gas bubbles in a constructive or dynamically, yieldably dammed chamber. Also provided is a propulsion device for the application of the above materials, with a support for a saline complex metal hydride of a lumpy consistency in a yieldably dammed expansion chamber in which an injection nozzle for the reagent is directed towards a surface portion of the metal hydride.

Accordingly, one of the significant reaction partners is a saline complex metal hydride, such as is delivered in large industrial quantities, especially under designations as sodium borohydride or sodium boranate ($NaBH_4$) by appropriate chemical concerns, particularly Bayer AG, Leverkusen, but also by Merck AG, Darmstadt, West Germany, to the chemical industry as a versatile employable reduction and hydrogenation medium. This extremely reactive boron compound with a high content of chemically bonded hydrogen is in a powder form as a raw material; but which solidifies in the surrounding atmosphere into lumpy pieces, which are also compressible into certain shapes. The normal case of utilization of these materials is the suspension of the pulverized material in a solvent, which is selected in conformance with the intended use; for example, organic compounds for reduction or inorganic salts, or in the industrial chemistry for the reduction of interfering compounds into inactive forms, which then no longer need to be inherently physically separated out in an expensive manner from the actual processing material. It is known to the practical chemical technician that conversions with sodium boranate are commonly carried with a large excess of reduction media, as a result of which excessive reduction media must be destroyed prior to the further processing of the reduction products through the careful addition of, for example, acidic salts, inasmuch as the disassociation procedure then releases hydrogen.

From the disclosure of German Laid-Open Patent Application No. 16 67 277 there has become known the utilization of these materials for the delivery of gaseous reactants for fuel elements, in which the gas development, in accordance with the requirement for a steady gas supply, should be automatically correlated with the gas takeup by the fuel element. For this purpose, the solid reactant substance in the form of a rod dips over a portion of its length into the liquid acidic reagent, whose liquid level changes for the variation of this immersion depth, in effect, for influencing the quantity of the developed reaction gas, in dependence upon the pressure fluctuation due to the fluctuation in the withdrawal of the reaction gas. Similar measures for the same intended application are known from the disclosure of U.S. Pat. No. 3,174,833 in which for the operation of the fuel element, while affording a constant pressure of the supplied reaction gas, the quantity of the introduced aqueous solution is regulated in dependence upon the pressure. The reaction takes place within a closed container, in which the metal hydride is present in a dispersed form, for example pulverized, and is completely saturated by the aqueous reaction partner which is introduced through a feed tube into the middle of the powder supply. By means of a perforated tube which is similarly inserted into this filling, there are withdrawn the reaction gases.

For effecting the displacement of water from a ballast tank or for the inflation of an ascent balloon, there is known from the disclosure of British Pat. No. 1,425,590, that a substance which becomes gas-generating upon contact with water, can be enclosed in a casing which is encompassed by water, which is ruptured through an explosive charge; such that the water penetrating into the casing will lead to the generation of reaction gases.

Deviating the utilization of the mentioned materials in connection with those previously known purposes (in view of the basic object of the invention), the invention is predicated on the recognition that just the sodium boranate in its powdery-lumpy form, which is still stable at temperatures below 0° C. and above 100° C. (which is irritating to the skin but, for the remainder, not critical with respect to any health or spontaneous detonation dangers), is particularly adapted that in simple arrangements at dosed spraying on of acidic reagent there can be obtained the reaction gas bubble, which due to its extremely steep pressure rise at an energy-rich expansion, is especially adapted for effecting the acceleration of masses relative to constructively or dynamically dammed expansion chambers. Pursuant to the inventive application of this material, in the presence of an aqueous reaction partner, there need merely be sprayed relatively small quantity of higher-concentrated acidic reagent (adapted as such to the same extent in particular mineral acids, organic acids or suspensions of acidic salts) onto the metal hydride which is to be supplied into the expansion chamber, and which is, for example, constructed rod-shaped and thereby easily supported, dosed in accordance with the quantity and periodicity. The sprayed jet of the reagent moistens a relatively large surfaced region of the metal hydride, but which is constructively bounded by the beam or jet direction, and within this region penetrates also into its porous structure. This leads to a suddenlike initiation of the large-scale production of reaction gas, which is simply influenced in its intensity through the suitable control of the jet and, especially, can also be disrupted and again be restarted. However, for example, even the metal hydride possessing the formula $KBH_4$ (potassium boranate) can be employed in an extremely advantageous manner when; concurrently, its handling is not quite as uncritical.

The reaction product formed by spraying the boranate with aqueous hydrochloric acid is practically pure hydrogen of exceedingly high combustible energy density, and with a gas quantity which lies at three-times to four-times the yield of usual explosive and propellant media employed in the ammunition technology. The gas quantity allows itself to be increased additionally by more than 10% when, during the course of the spontaneous formation of the hydrogen, this is also concurrently combusted; and that an oxidant is sprayed in with the reaction acid. It is especially expedient to spray the boranate, which is offered in a solids consistency, with aqueous nitric acid, inasmuch as this then concurrently serves as an oxidant for the combustion of the hydrogen formed during the spontaneous reaction. A trace addition of metal, especially copper, acts catalytically and assists in the further increase of the energy density, as well as in the quantity of combustion gas.

In every instance does the utilization of metal hydride, water and acidic reagents represent the ideal reaction partner for a bubble generator, due to the large and energy-rich reaction gas volume possessing the greatest degree of efficiency; whereby for the gas generator the special further advantage is of practical significance that, without anything further, and still further increasing the degree of efficiency, concurrent with the combustion of the hydrogen which is obtained in a large quantity, there is achieved a propulsion system which is compatible with the environment on the basis of uncritically available and handled reaction partners, through which there can be realized a closed-circuit combustion process which is technologically uncritical and employable in many applications.

The water reaction or jet propulsion engine for watercraft, as known from the disclosure of German Pat. No. 11 22 403, for an intermittent mode of operation necessitates an oscillating valve member for the periodic closing of the inlet, during the applicable water column or piston ejection opposite the direction of movement of the watercraft. The requirement for such an oscillating valve member produces considerable constructive demands and considerably restricts the water ejecting quantity and, thereby, the vehicle speed which is attainable with such a water reaction engine.

Ascertainable as a further disadvantage in every such previously known arrangement is that the combustion reactions which takes place either within or rearwardly of the valve member lead only to a relatively moderate degree of thermodynamic efficiency of the arrangement inasmuch as, due to the limited operating frequency of the valve member over presently relatively lengthy time spans, there are transmitted relatively large quantities of heat from the combustion chamber into the outflowing water.

With comparable propulsion arrangements pursuant to the invention, at a significant improvement in the degree of efficiency, there can be attained higher ejection frequencies at a mode of operation which is not susceptible to disturbances.

To that extent, the underlying concept of the invention consist of in that there can be avoided the heat loss the fluid which lowers the degree of efficiency, as well as the constructive problems and technological operating limitations placed on a mechanical, oscillating valve member in that for the separation of an extendable fluid piston and for its ejection, there is employable the expanding action of a (initially relatively small, highly compressed) reaction gas bubble, when (because of the configuration in the surroundings of the expansion chamber within the device) there takes place during the expansion of this bubble a dynamic damming with respect to the relatively slowly or sluggish and incompressibly inflowing fluid mass. The extraordinarily rapidly following expansion of the gas bubble leads to the separation of a fluid piston from the inflow with dynamic damming opposite the piston displacement direction; and due to the exceedingly rapid increase in the gas pressure, at poor heat transfer phenomena along the boundary surface of the gas with the encompassing fluid, there is produced only an extremely low heat loss from the gas bubble into the fluid, and thereby a high degree of thermodynamic efficiency.

The succession of the reaction gas bubbles can be produced within the propulsion device, directly within the expansion chamber itself, in that the reaction materials are introduced therein and brought into reaction with each other; whereby these materials are suitably so selected that the fluid (especially water) itself represents one of the reaction partners. However, it can also be provided to periodically operate the gas bubble generator exteriorly of the inside of the propulsion device, and to introduce the reaction gases into the expansion chamber after presently exceeding a preset minimum pressure through a shock-wave tubular flow passageway. By means of the periodicity of the gas bubble expansion, correlated with the inflow conditions of the fluid into the propulsion device, there can be influenced the ejection frequency, and thereby the quasi-continuous speed of the device relative to the surrounding or through-flowing fluid. Since the resistance forces which emanate from the fluid rise exponentially with an increase in the speed, it can be expedient to increase the energy content of the gas bubbles (for instance, through the dosing with the mutually reacting materials) proportionally with the frequency of the gas bubble delivery, such that there can be achieved a speed variation over a large operating range.

The propulsion device is particularly adapted to the same extent as a propulsion arrangement for surface watercraft or as a propulsion device for underwater vehicles or submersibles, as well as for the initial acceleration and also for the maintaining of or increase in the traveling speed subsequent to another initial acceleration; whereby, in these instances, the surrounding water itself represents the fluid. The propulsion device can also be used stationarily, for instance, as the drive unit in the flow circuit of a hydrodynamic machine; for example, as is known as a hydro-motor or hydro-drive (VOITH Brochure G 671 of October 1979).

Whereas, for instance, for underwater vehicles, especially because of reasons of the cavitation formation with the usual screw drive, certain speed limits (in the magnitude of up to 30 meters/second) cannot be readily exceeded, by means of an inventive propulsion device (without any moving components in the drive itself) there can be reached without any problems twice the speed in the water; and through the correlation of the geometry of the propulsion device with the successive frequency and the energy content of the gas bubbles, can also be further increased; and any handling problems encountered with regard to accidents in the region of the propeller are thereby completely eliminated. A further increase in the efficiency and the relative speed is then particularly possible through correlation of the fluids with the behavior of the expanding gas bubbles, when the propulsion device is a component of a closed flow circuit (for example, that of a stationary installation), in effect, in contrast with the conditions in a watercraft in which the fluid must be separately supplied, and, as a result, can be optimized with respect to the propulsive reaction.

BRIEF DESCRIPTION OF THE DRAWINGS

Additional alternatives and modifications as well as further features and advantages of the invention can be readily ascertained from the following detailed description thereof, taken in conjunction with the accompanying drawings illustrating generally diagrammatic embodiments of the invention; in which:

FIG. 3 illustrates a fluid piston-propulsion device in the form of a rapidly-traveling propulsion jet cell with a gas generator arranged externally of its gas bubble-expansion chamber;

FIGS. 4a through 4f illustrates the operating mechanism of the propulsion in different, successive operational phases;

FIG. 5 graphically illustrates a qualitative time plot across the pressure and movement sequences, in conformance with the functions of FIGS. 4a through 4f;

FIG. 6 illustrates an example for the bubble generation directly within the expansion chamber;

FIG. 7 illustrates a modified propulsion device similar to that of FIG. 3, on an underwater vehicle;

FIG. 8 illustrates a propulsion device which is modified with respect to that shown in FIG. 3, which is employed in the closed flow circuit of a hydrodynamic machine.

DETAILED DESCRIPTION

Figure 1:
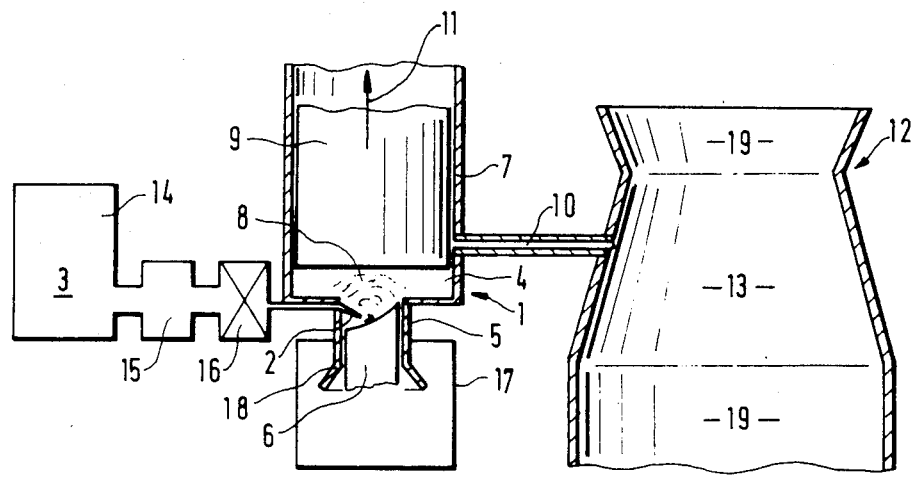
FIG. 1 illustrates a sectional view through a gas generator with a constructively rigid damming of its reaction gas-expansion chamber with consideration given to the special conditions at different cases of utilization of that type of a gas generator.

Illustrated in FIG. 1, in a longitudinal axial sectional view, is a gas bubble generator 1, wherein an injection nozzle 2, for example, for acid 3, connects into the reaction gas-expansion chamber 4 opposite a support 5 for a rod which is constituted, for instance, of sodium boranate 6. The expansion chamber 4 is enclosed so as to have a shape which is constructively rigid by a wall 7, and by a piston 9 which is displaceable upon the expansion of the reaction gas 8, for enlarging the expansion chamber. When this piston has achieved a desired displacement due to the pressure of the expanded reaction gas 8 then, for instance directly by means of the piston 9 itself, there can be opened a discharge tube 10 for the outlet of the depressurized reaction gases, or in accordance with the constructive conditions, for the further depressurization of the still expanding reaction gases 8.

The piston 9 can also relate to a displacement piston (of the type of a usual Otto engine) which is oscillatingly guided within a cylinder in the shape of the wall structure 7, or at suitably correlated constructive conditions, can also relate to a rotary piston.

The piston 9 can also be understood to comprise a projectile, which as the result of the expansion pressure of the reaction gas 8 accelerates from a weapon barrel (in the shape of the wall structure 7) in the direction of the arrow 11; in effect, is to be shot out. The term "piston" (9) can also relate directly to any other suitable component which, on the one side, closes off the expansion chamber for the gas 8 and, on the other side (due to expansion of the chamber), should be moved at a high initial acceleration and propelling force in the direction of arrow 11, when due to any kind of external influence there is moistened the metal hydride by the acid 3. It can also be considered that the piston 9 operates in the direction of arrow 11 against a resilient resetting force, such as against a counter-pressure spring (not shown in the drawing), whereby because of the corresponding displacement of the piston 9, the transfer connector from the expansion chamber 4 to the discharge tube 10 is only opened when, during the course of the development of the reaction gas in the expansion chamber 4, there is built up a pressure which exceeds the counter-pressure acting opposite the direction of the arrow 11.

The discharge tube 10 can be constructed as a jet nozzle when gas generator 1 is applied as a recoil propulsion device in the type of a rocket propulsion mechanism or cruise drive propulsion charge.

An effort is to be made that an expansion gas-shock wave be introduced with the steepest possible rising pressure wavefront into the diffusor 13 which is filled with fluid; such that the reaction gas 8 at that location will not only penetrate into the fluid in one passageway, but will displace this at a large-surfaced phase boundary (under dynamic damming towards the diffusor inlet). For this purpose, the discharge tube 10, which is opened only at a certain minimum pressure of the reaction gas 8 to the expansion chamber 8, is dimensioned as a so called impulse tube; in effect, essentially as an extremely thin tube in relationship to its length.

The supply of the injection nozzle 2 with acid 3 from a supply container 14 is effected through a pumping arrangement 15 (which is installed either as a self-contained pump, or can be implemented by a supply container-pressure vessel) and through a pulsing and metering valve 16. The sodium boranate 6 can be directly supplied as a rod by means of a feeding device 17 in the holder 5, in order to be moistened in an edge region of the expansion chamber 4 for the gas-formation reaction from the injection nozzle 2 with an aqueous acid 3, or with an acid besides an additionally injected water jet. However, it can also be provided to make the sodium boranate 6 available in a lumpy-kernel condition; in effect granular-like, and only first in a functional communication with the feeding device 17 by means of an extruding device 18 to densify it into a compact mass which is located opposite the injection nozzle 2.

Figure 2:
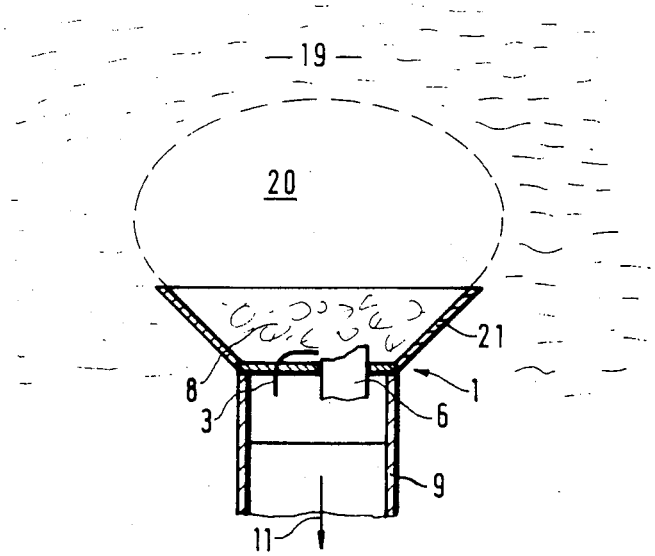
FIG. 2 illustrates a sectional view of an embodiment of a gas generator with dynamic damming of the reaction gas-expansion chamber.

Illustrated in FIG. 2 is another application of the gas bubble generator 1 for propulsion devices. The surface portion of the sodium boranate 6 which is to be subjected to acid 3 from the injection nozzle 2 is herein rinsed about by an aqueous liquid 19. Due to the mass of the liquid 19 which is sluggish in relationship with the expansion energy of the reaction gases 8, there takes place the dynamic damming of the reaction gases 8 in a gas bubble 20, against which there directly, or through a type of propulsion mechanism 21, supports itself the tail end portion of a piston 9 or the like which is configured in a flow-enhancing or aerodynamic manner. This piston is then thereby accelerated by the spreading gas bubble 20, but which is dynamically supported with respect to the liquid 19, in the direction of arrow 11.

The basic configuration of an inventive fluid piston-propulsion device 101, which is shown in FIG. 3 in an axially longitudinal section, as a thrust or propulsion cell, is essentially an aerodynamically configured nozzle-shaped structure between a fluid inlet 102 and a discharge tube 103 which in relation therewith is lengthier but still relatively short relative to its diameter. Formed behind the inlet 102 is a fluid inlet nozzle 104; namely, in the shape of an initially relatively rapidly narrowing and thereafter less steeply expanding cross-section into a multiple of the former. The geometry of the cross-section can conform to that of the propulsion device 101 itself; in effect, can be circular or ring-segmented. The cross-section behind the inlet nozzle 104, which again widens as viewed from the direction of the inlet 102, acts as a diffusor 105 whose largest cross-section forms a transition into the aerodynamically-profiled discharge tube 103. The surrounding space of the transition from the diffusor 105 to the discharge tube 103 serves as an expansion chamber 106, as is elucidated in detail hereinbelow. Connecting therewith, when a separate gas generator 108 is provided externally of the expansion chamber 106, is at least one shock wavetube-like (in effect, extremely thin in relationship to its length) flow passageway 110; and which by means of a pressure limiting valve 124 (referring to FIG. 8) is then always connected for a short time to the generator 108 when the reaction gases in the latter exceed this minimum pressure, in order to then transfer them as a compressed gas bubble 115 with a steep pressure wavefront into the expansion chamber 106.

When the propulsion device 101 is not arranged stationarily, but is intended to travel through the encompassing fluid 111, especially for instance, through water, then also the exterior of the propulsion device 101 is constructed with a flow-enhancing or aerodynamic profile; for example, is covered by a mantle 112 which encompasses the gas generator 108.

The propulsion device 101, and thereby its inlet nozzle 104, move relative to the fluid 111 at such an orientation, that the fluid 111 enters in the direction of the static pressure 113 through the inlet nozzle 104 into the diffusor 105, as is shown in FIG. 4a. When the fluid or liquid column 114 has also filled the inside of the discharge tube 103, at least substantially, as shown in FIG. 4b, there is then allowed the expansion of a relatively small but intensively densified energy-rich reaction gas bubble 15 in the chamber 106.

The gas bubble 115 decompresses in the liquid column 114 in a practically explosion-like manner, as opposed to the damming effect of the relatively sluggish mass of the encompassing fluid 111. Due to the cross-sectional reduction of the diffusor 105, the damming effect is greatest against the direction of the static pressure 113.

Therefore, the greatest growth component of the decompressing gas bubble 115 lies somewhat coaxially in the discharge or ejection tube 103, in the discharge direction 116 (FIGS. 4c and 4d); with the result, that in the transition region between the diffusor 105 and the discharge tube 103, a fluid piston 117 is separated from the fluid column 114 and pressed out from the discharge tube 103 into the surrounding fluid or liquid 111 in the static pressure direction 113 (opposite the inlet 102). The mechanical supporting reaction follows through the expanded gas bubble 115 against the narrowing cross-section of the diffusor 105, as a consequence of which, the propulsion arrangement 101 is moved relative to the surrounding fluid 111 in the propulsion direction 118, in effect opposite the inlet or the static pressure 113 (FIG. 4e); which facilitates the renewed filling of the inside of the propulsion device 101 with a fluid or liquid column 114 (FIGS. 4f–4a). Now, there can they be repeated the procedure by placing into preparation a further compressed expansion gas bubble 115 in the chamber 106 (FIGS. 4b–4e).

As is illustrated in FIG. 5 by means of a simplified (idealized) time plot, the fluid 111 enters the inlet 102 at a relatively constant inlet speed 113. When the propulsion device 101 is filled with the liquid column 114 at the time point t 114, then the gas bubble 114 is placed into a condition of preparedness in the expansion chamber 106. Taking place therein together with the expansion of the bubble 115 is an extremely steep rise, at its maximum flattened for a short time, of the pressure p106(t). The steep pressure rise and the sluggish mass of the fluid 111 which is obtained through the inlet nozzle 104 due to the expansion of the closed gas bubble 115 and under a reduction of the pressure p106, forces a separation of the fluid piston 115 from the fluid column 114 at a growing ejection speed v114/117(t).

The expansion properties of the gas bubble 115 and the diameter, as well as the shortness of the discharge tube 113 are preferably so correlated with regard to each other that the fluid piston 117, possibly just upon attaining its maximum speed v117, has exited from the rearward opening of the ejection or discharge tube 103 (FIG. 4e). This then will preclude a build-up of the vacuum in the chamber 106; in essence, avoid an aspiring effect on the fluid piston 117 which is to be ejected and which would tend to reduce the degree of efficiency. Similarly, in the interest of attaining a satisfactory degree of efficiency, are the geometries of the inlet nozzle 104 and the periodic preparation of the expanding reaction gas bubbles 115 preferably so correlated with each other that the next filling of the discharge tube 103 with a fluid column 114, and then the separation and the ejection of the fluid body 117, will follow so closely, that the fluid piston 117 which exits the ejection opening 119 there still finds a hollow space, or in any event a vacuum, so as to have to displace as little as possible from the sluggish mass the fluid 111 present behind the propulsion device 101.

Thus, the fluid 111 which flows through the ejection or discharge tube 103 is periodically so accelerated by the expansion gas bubbles 115, that there is ejected a pulsating, but practically compact, jet (in the wake of the fluid piston 117), whose thrust reaction pulses lead to the movement of the propulsion device 101 opposite the fluid 111. Obtained thereby is a particularly satisfactory degree of thermal and mechanical efficiency, inasmuch as only individual, highly-compressed gas bubbles 115 will always react with the surrounding fluid 111 over presently only extremely short time spans; and since the damming effect of the expanding bubbles 150 with respect to the fluid column 114 produced in the diffusor 105 renders superfluous any kind of mechanically-constructed valve structure, the pressure action during the ejection of the fluid piston 117 thus does not operate against any movable mechanical system; directly by means of the damming effect of the fluid 111 itself does this result in a pulse transmission to the inside of the propulsion device 101 in the transitional region between the discharge tube 103 and the diffusor 105.

The relatively high thrust impulses can be achieved with relatively small quantitation of reaction partners, which brought periodically into reaction with each other directly in the expansion chamber 106, or also in a separate gas generator 108.

For the supply of the bubbles 115 there are basically adapted the rapidly reacting and gas rich solid and liquid propellants which are known from the pyrotechnology; for example, hypergolic components or monergolic propellants (such as nitromethane) in a Diesel ignition arrangement. Simpler from an apparatus requirement is the reaction of jets; for example, of nitric acid and hydrazine, directly within the expansion chamber 106. A still more expedient time sequence for the pressure p106(t) with respect to the contemplated steep rise in the pressure are delivered by the volume-richer and higher compressed reaction gases, which are encountered in the reduction of (heretofore not employed as propellants but for the reduction tasks) metal hydrides with acidic reagents and water, as hereinabove elucidated. The attachment of a gas generator 108 which is to be independently operated is thus eliminated when, pursuant to FIG. 6, a rod 107 constituted, for example, of sodium boranate is advanced into the expansion chamber 106 and therein periodically sprayed on with, for example, nitric acid from a nozzle 109.

Through the expansion frequency of the bubbles 115, the acceleration attainable with the propulsion device 101 allows itself to be varied, and thereby the speed v114/117 relative to the fluid 111. In any event the resistance forces which are exerted by the fluid 111 rise as the square of the speed v117. Consequently, it is expedient for a speed increase, to not only increase frequency of preparation of the bubbles 115, but also their energy content, in effect, for example, to increase the propellant or acid quantities which are presently available for the gas recovery, in order to overcome the rising resistance forces which are dependent upon the speed. With a fixed bubble frequency and a fixedly pregiven mass of the reaction partner which is employed for bubble formation, there is then set opposite thereto certain maximum speed v117, as indicated in FIG. 5.

In the case of the utilization of thrust cells according to the propulsion device 101 of FIG. 7, this would relate the the acceleration of an underwater vehicle 125. The propulsion device 101 can be arranged coaxially about and rearwardly of its tail end 126, such that there are produced annular gap shaped geometries for the inlet nozzle 104 and the diffusor 105.

However, more expedient is a grouping of a plurality of a peripherally adjoiningly arranged thrust cells with the cross-section of circular ring segments on the vehicle trailing end, and for example, with a central gas generator 108 for all segments located within the vehicle 125. The shock wave-flow passageways 110 lead then from the valve 124 to the expansion chambers 106, when the propellants pursuant to FIG. 6 are not directly brought into reaction therein.

As is illustrated in FIG. 8 for a relatively slowly running stationary hydrodynamic machine, the propulsion device 101 (instead of its configuration as a free-traveling or following thrust cell pursuant to FIGS. 3, 6 and 7) can also be utilized in a closed fluid flow circuit 120 in which, for example, for coupling the movement, there can be arranged an impeller wheel 122 rotating about a shaft 121 as closely as possible behind discharge or ejection tube 103 of the thrust cell. A filter 123 serves for separating impurities out of the fluid 111 prior to its recycling into the thrust cell-propulsion device 101. The formation of reaction residues can, however, be maintained extremely low, when (pursuant to the above-mentioned example) there is a reaction product is produced from the gas bubbles 115, and which, for example, is water as is the fluid 111.

Figure 9:
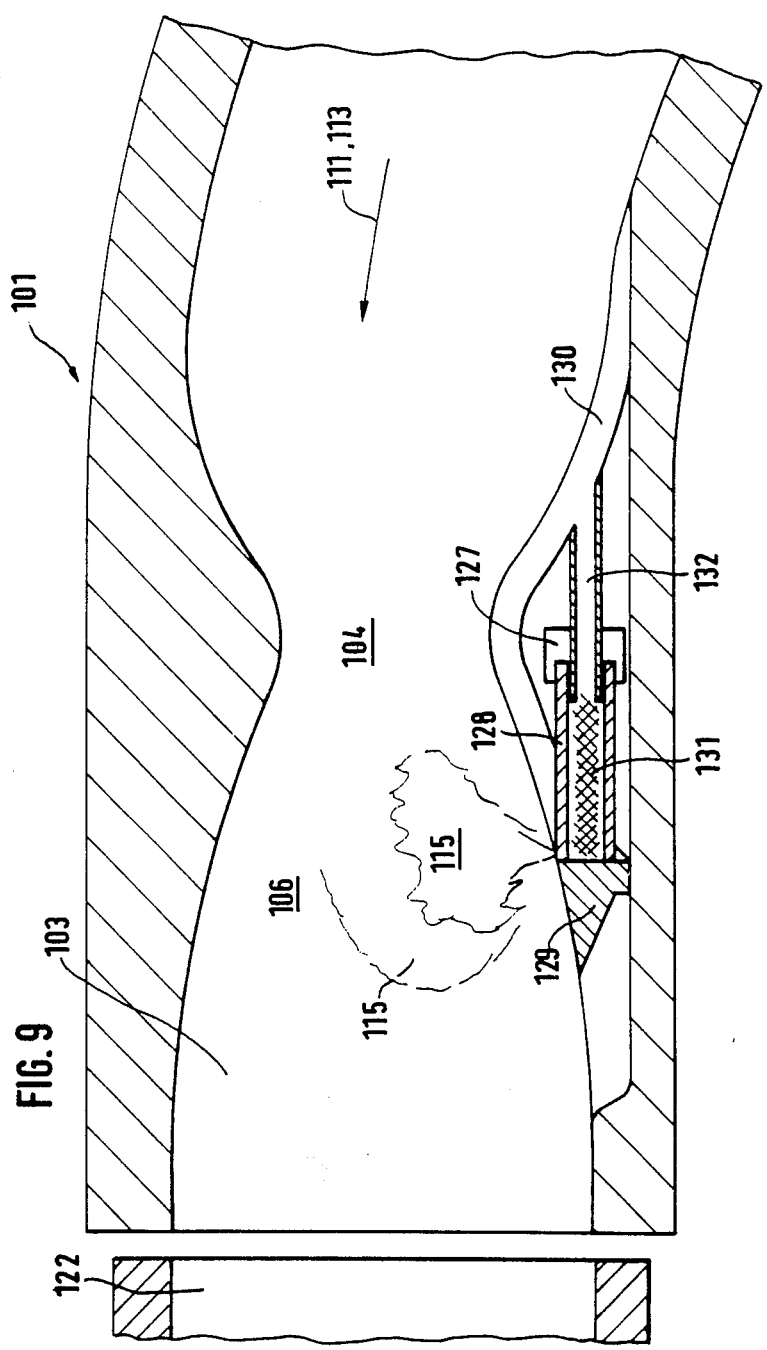
FIG. 9 illustrates an ignition device for a solid gas bubble-reaction partner.

Also, in the example pursuant to FIG. 9 does the generation of the reation gas, for the periodic supply of the expansion bubbles 115, take place directly in the region of the expansion chamber 106. For this purpose there is provided a vibration arrangement 127, which presses a rod 120 periodically for a short period against (opposite the rod 128 on an electrically positive potential) counter-electrodes 29 constituted of a material which does not easily fuse with the rod. Upon raising away (as is known from the technology of electrical welding) there is produced an arcing, whose energy leads to the smelting and vaporization of particles at the end surface of the rod 128. With a suitable material selection (in particular aluminum opposite a copper block) these gases react under intensive gas development with the surrounding fluid 111, in this instance water. For intensive propagation, the contact terminal projects into the expansion chamber 106, or (due to aerodynamic reasons, as shown in FIG. 9) into a longitudinal passageway 130 which is formed into the inner wall of the device 101 and is thereby also streamed through; however, the arrangement of the rod 128 can also be oriented transverse to the illustrated longitudinal direction. Suitably, the rod 128 is constructed hollow and filled with an expansion material 131 which will intensively accelerate forwardly the smelted particles and the vapors at the burning-down end of the rod 128, in effect, through intimate mixing assists the intensive formation of reaction gas with the fluid 111 in the expansion chamber 106. This material 131 can be the fluid-water itself which, for example, is introduced through an inlet 132 into the hollow rod 128. At the burning down end surface of the water-filled aluminum tube there then takes place the most intensive reaction and increase in the gas pressure, whereby the vapors and smelt particles are thrown into the expansion chamber 106. Created thereby is an exceedingly operationally-dependable expansion gas bubble generator, which is especially adapted for stationarily operated hydrodynamic installations pursuant to FIG. 8.

What is claimed is:

1. Utilization of saline, complex metal hydrides which is present in a lumpy consistency, and an acidic reagent which is sprayed onto the metal hydride, for the pulse-like generation of expanding reaction gas bubbles in a chamber having a dynamically yieldable dammed portion, said portion being immersed in an aqueous fluid for the accelerating of masses.

2. Utilization as claimed in claim 1, including trace additions of catalytically acting metals in addition to the acidic reagent.

3. Utilization as claimed in claim 2 wherein the catalytically acting metal is copper.

4. Utilization as claimed in claim 1, wherein said metal hydride is formed as a rod insertable into said chamber.

5. Utilization as claimed in claim 1, wherein water is employed for moistening at least the region of the metal hydride which is sprayed with the acidic reagent.

6. Utilization as claimed in claim 1, wherein an aqueous acidic reagent is sprayed onto the metal hydride.

7. Utilization as claimed in claim 1 wherein the generated reaction gas bubbles are concurrently combusted.

8. Propulsion device for accelerating masses, including saline, complex metal hydride in a lumpy consistency and an acidic reagent sprayed onto the metal hydride for the pulse-like generation of expanding reaction gas bubbles said device comprising an expansion chamber having a dynamically yieldable dammed portion, said yieldable portion being immersed in an aqueous fluid; a support for said metal hydride in said chamber; and a reagent injection nozzle in said chamber being directed towards surface portion of the metal hydride.

9. Device as claimed in claim 8, wherein the surface portion of the metal hydride which is subjected to the injection nozzle is located at the edge of the yieldably dammed expansion chamber.

10. Device as claimed in claim 9, wherein the expansion chamber is located within a thrust cell from which the reaction gas bubble expels a fluid piston.

11. Device as claimed in claim 10, wherein a periodically operable gas generator is connected to the expansion chamber through a pressure limit valve and a shock wave flow passageway.

12. Device as in claim 11, wherein the device is a free traveling fluid-propulsion device.

13. Device as claimed in claim 10, wherein said device is arranged in a cyclical system for a dynamically damned fluid.

14. Device as claimed in claim 13, wherein said device is arranged upstream of an impeller wheel of a hydrodynamic machine.

15. Device as claimed in claim 10, comprising means for the direct infeed of the complex metal hydride into the expansion chamber.

16. Device as claimed in claim 9, wherein the reaction chamber is connected by an impact tube to the thrust cell from which the fluid piston is expelled by the reaction gas.

17. Device as claimed in claim 9, wherein said device is arranged in an underwater vehicle.

18. Device as claimed in claim 9, wherein the expansion chamber is dammed by a piston.

19. Device as claimed in claim 18, wherein the piston comprises a fireable projectile.

20. Device as claimed in claim 8, wherein the surface portion of the metal hydride subjected to the injection nozzle projects into said expansion chamber and is rinsed about by an aqueous fluid.

21. Device as claimed in claim 20, comprising vibration means for periodically pressing a melting rod against a counter electrode lying at a different electrical potential.

22. Device as claimed in claim 21, said rod being hollow, including an expansion material located in the interior of said hollow rod.

23. Device as claimed in claim 8 wherein the accelerated mass is the aqueous fluid.

24. Device as claimed in claim 8 wherein the accelerated mass is the support means.

25. Device as claimed in claim 8 wherein the reagent injection nozzle is pulsed.

26. An apparatus for accelerating masses comprising a support means;
a dynamically yieldable chamber surrounding said support means, the walls of said chamber being defined at least in part by an aqueous fluid;
a complex metal hydride in a lump consistency supported for reaction by said support means;
and a reagent nozzle for spraying an acidic reagent on said metal hydride whereby the reaction of the acidic reagent and the metal hydride generates a gas which defines said chamber within said aqueous fluid, to thereby generate a reaction force between said fluid and said support.

* * * * *

UNITED STATES PATENT AND TRADEMARK OFFICE
CERTIFICATE OF CORRECTION

PATENT NO. : 4,744,300

DATED : May 17, 1988

INVENTOR(S) : Horst G. Bugiel

It is certified that error appears in the above-identified patent and that said Letters Patent is hereby corrected as shown below:

Column 11, line 26, cancel beginning with "1. Utilization of saline, complex metal hydrides" to and including "are concurrently combusted." in Column 11, line 48, insert the following claims:

1. A process for the pulselike generation of expanding reaction gas bubbles, said process comprising spraying acidic reagent onto saline complex metal hydrides which are present in a lumpy consistency in a chamber having a dynamically yieldable dammed portion, said portion being immersed in a aqueous fluid for the accelertion of masses.

2. A process for the pulselike generation of expanding reaction gas bubbles as claimed in Claim 1, wherein the process is conducted in the presence of trace additions of catalytically acting metals in addition to the acidic reagent.

3. A process for the pulselike generation of expanding reaction gas bubbles as claimed in Claim 2 wherein the catalytically acting metal is copper.

4. A process for the pulselike generation of expanding reaction gas bubbles as claimed in Claim 1, wherein said metal hydride is formed as a rod insertable into said chamber.

5. A process for the pulselike generation of expanding reaction gas bubbles as claimed in Claim 1, wherein water is employed for moistening at least the region of the metal hydride which is sprayed with the acidic reagent.

6. A process for the pulselike generation of expanding reaction gas bubbles as claimed in Claim 1, wherein an aqueous acidic reagent is sprayed onto the metal hydride.

UNITED STATES PATENT AND TRADEMARK OFFICE
CERTIFICATE OF CORRECTION

PATENT NO. : 4,744,300

DATED : May 17, 1988

INVENTOR(S) : Horst G. Bugiel

It is certified that error appears in the above-identified patent and that said Letters Patent is hereby corrected as shown below:

7. A process for the pulselike generation of expanding reaction gas bubbles as claimed in Claim 1, wherein the generated reaction gas bubbles are concurrently combusted.

Signed and Sealed this

Twenty-first Day of February, 1989

Attest:

DONALD J. QUIGG

*Attesting Officer*      *Commissioner of Patents and Trademarks*